United States Patent
Chien et al.

(10) Patent No.: US 10,618,534 B2
(45) Date of Patent: Apr. 14, 2020

(54) MONITOR VEHICLE FOR A RAIL SYSTEM AND METHOD THEREOF

(71) Applicant: TAIWAN SEMICONDUCTOR MANUFACTURING CO., LTD., Hsinchu (TW)

(72) Inventors: Shih-Hung Chien, Taichung (TW); Jen-Ti Wang, Taichung (TW); Fu-Hsien Li, Taichung (TW); Chih-Hung Liu, Tainan (TW); Yung-Lin Hsu, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/673,678

(22) Filed: Nov. 4, 2019

(65) Prior Publication Data

US 2020/0062285 A1     Feb. 27, 2020

Related U.S. Application Data

(63) Continuation of application No. 15/645,980, filed on Jul. 10, 2017, now Pat. No. 10,464,583.

(60) Provisional application No. 62/427,108, filed on Nov. 28, 2016.

(51) Int. Cl.

| *B61L 23/04* | (2006.01) |
|---|---|
| *B60M 1/12* | (2006.01) |
| *B61B 13/00* | (2006.01) |
| *B61K 9/08* | (2006.01) |
| *B61L 25/02* | (2006.01) |
| *B60M 1/28* | (2006.01) |
| *B61D 3/02* | (2006.01) |

(52) U.S. Cl.
CPC ............. *B61L 23/044* (2013.01); *B60M 1/12* (2013.01); *B60M 1/28* (2013.01); *B61B 13/00* (2013.01); *B61D 3/02* (2013.01); *B61K 9/08* (2013.01); *B61L 23/047* (2013.01); *B61L 25/025* (2013.01)

(58) Field of Classification Search
CPC . B60M 1/12; B60M 1/28; B61B 13/00; B61L 23/044; B61L 23/047; B61L 25/025
See application file for complete search history.

(56) References Cited

U.S. PATENT DOCUMENTS

| 2007/0217670 A1* | 9/2007 | Bar-Am | B61K 9/08 382/141 |
|---|---|---|---|
| 2016/0039439 A1* | 2/2016 | Fahmy | B61L 27/0088 701/20 |
| 2016/0194012 A1* | 7/2016 | Matthews | B61L 3/10 246/121 |
| 2016/0368510 A1* | 12/2016 | Simon | B61D 15/12 |
| 2017/0066459 A1* | 3/2017 | Singh | B61L 23/044 |
| 2017/0305442 A1* | 10/2017 | Viviani | B61D 15/12 |

(Continued)

*Primary Examiner* — Francis C Gray
(74) *Attorney, Agent, or Firm* — Maschoff Brennan

(57) ABSTRACT

A monitor vehicle for a rail system includes a wheeled trolley, an overhead vehicle, a supporting structure, and a first sensor. The wheeled trolley is above a rail of the rail system, is operable to move over the rail, and has a bottom surface. The overhead vehicle body is suspended by the wheeled trolley and below the rail. The supporting structure connects the wheeled trolley and the overhead vehicle body. The first sensor is on the bottom surface of the wheeled trolley and is configured to detect a first parameter of the rail of the rail system.

20 Claims, 5 Drawing Sheets

(56) References Cited

U.S. PATENT DOCUMENTS

2018/0143017 A1\* 5/2018 Choi .................. B61K 9/08
2018/0222504 A1\* 8/2018 Birch ............... B61L 23/045
2018/0339720 A1\* 11/2018 Singh ................ B61K 9/08

\* cited by examiner

MONITOR VEHICLE FOR A RAIL SYSTEM AND METHOD THEREOF

RELATED APPLICATIONS

The present application is a continuation application of U.S. application Ser. No. 15/645,980, filed Jul. 10, 2017, now U.S. Pat. No. 10,464,583, issued Nov. 5, 2019, which claims priority to U.S. Provisional Application Ser. No. 62/427,108, filed Nov. 28, 2016, which is herein incorporated by reference in their entirety.

BACKGROUND

The semiconductor industry has experienced exponential growth, and integrated circuits (ICs) are used in a wide variety of applications such as a memory, as a central processing unit (CPU), liquid crystal display devices (LCD), light emitting diodes (LED), laser diodes, or as micro-chips. During manufacturing of semiconductor integrated circuits, semiconductor wafers are subjected to multiple processing steps at different processing equipment. For example, to complete the fabrication of an IC chip, various steps of deposition, cleaning, ion implantation, etching, and/or passivation steps are generally carried out in different processing equipment. Therefore, fabrication facilities generally include rail systems such as an automated material handling system (AMHS) for transporting the semiconductor wafers among the processing equipment.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
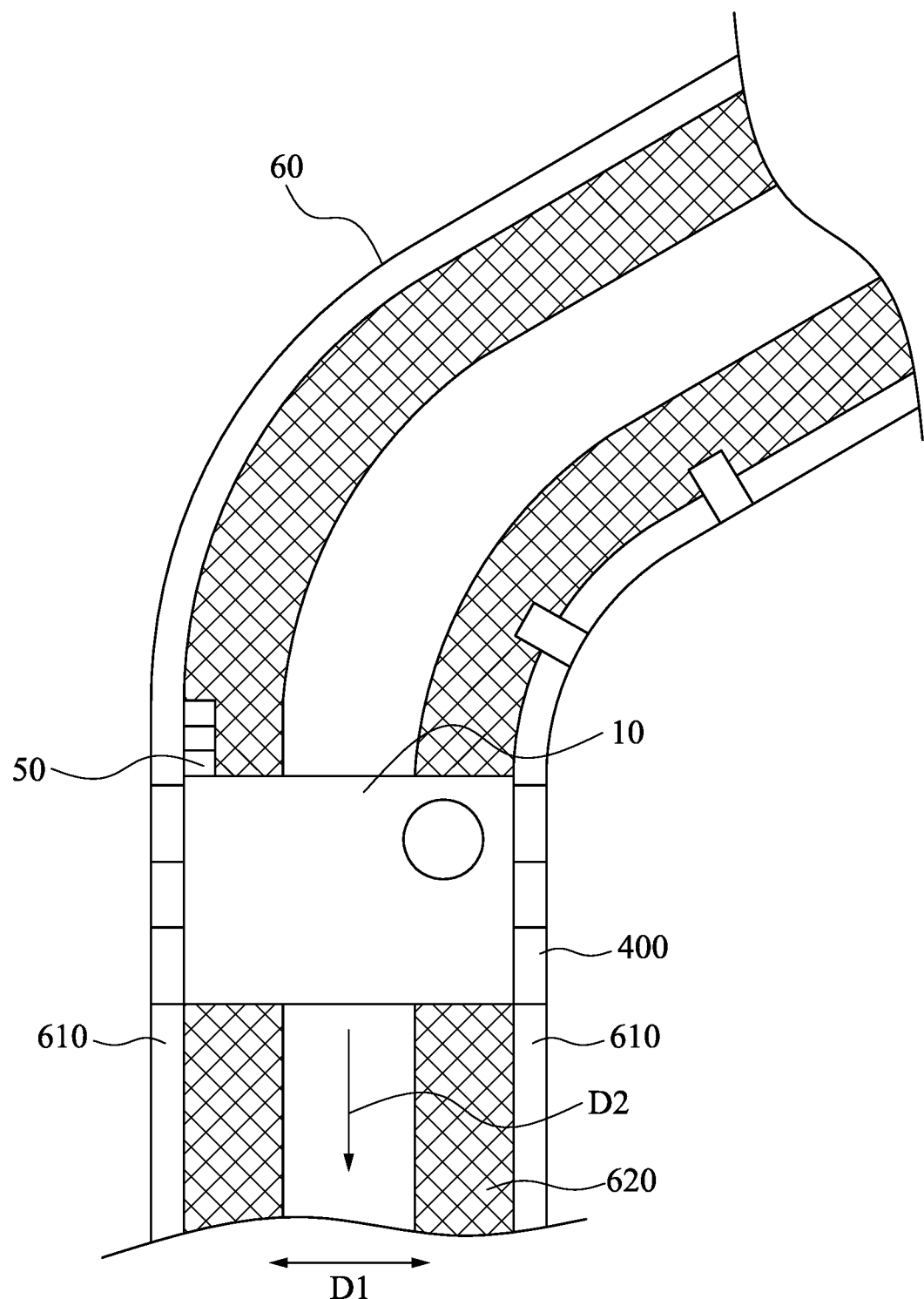
FIG. 1 is a top view of a monitor vehicle in a rail system in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, operations, operations, elements, and/or components, but do not preclude the presence or addition of one or more other features, regions, integers, operations, operations, elements, components, and/or groups thereof.

In a fabrication facility, abnormalities for a rail system, such as abnormal vibrations, temperature, particles, rail height difference, or optical signals of the rail system may increase the risk of unexpected damage, particles or features formed on the wafers, and/or decrease the yield rate of the manufacturing process. Therefore, detecting or monitoring one or more parameters of one or more rails of the rail system may avoid transportation abnormalities when transporting the semiconductor wafers.

Figure 2:
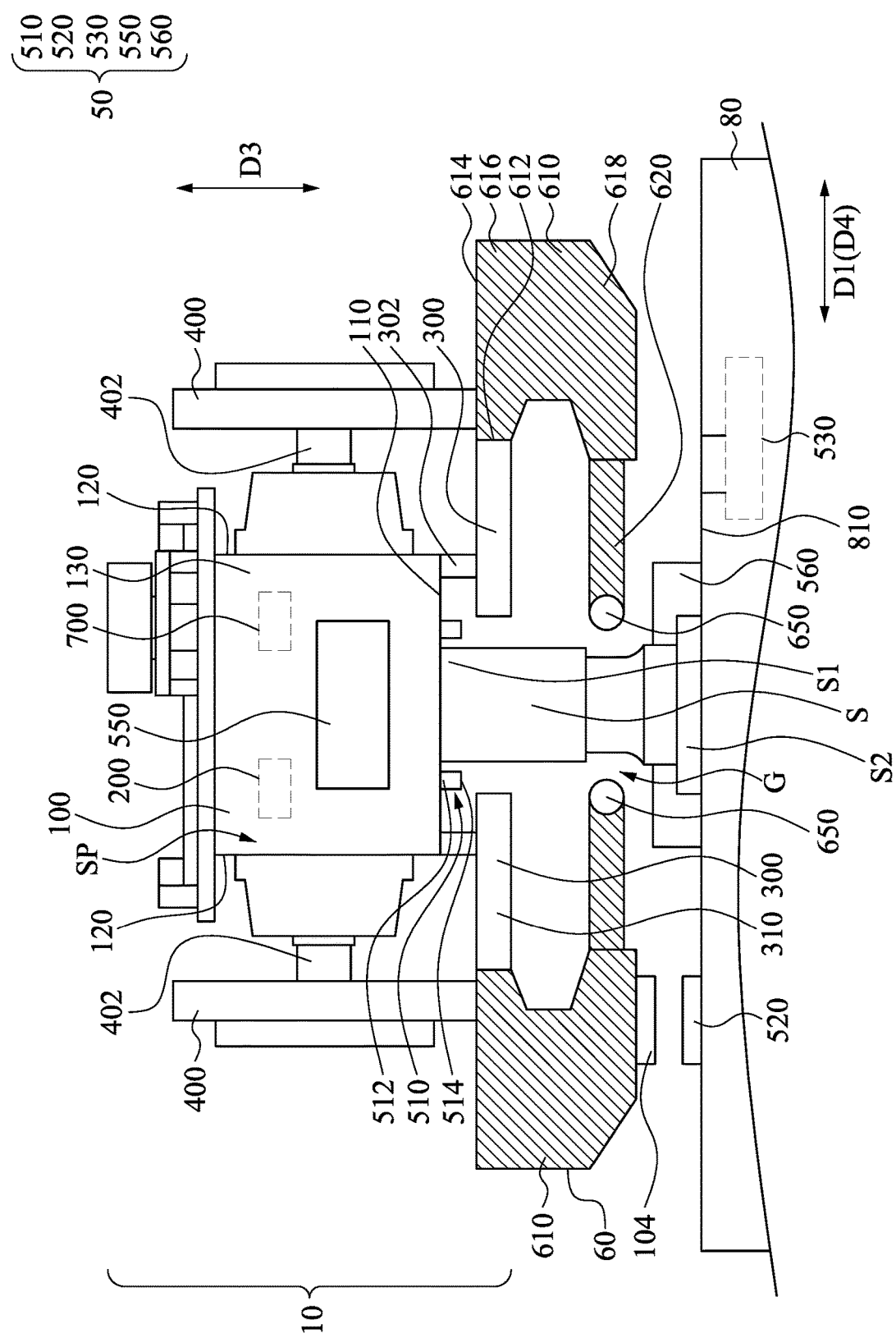
FIG. 2 is a cross-sectional view of monitor vehicle in a rail system in accordance with some embodiments of the present disclosure.

Reference is made to FIG. 1 and FIG. 2. FIG. 1 is a top view of a monitor vehicle over a rail system in accordance with some embodiments of the present disclosure. FIG. 2 is a cross-sectional view of a monitor vehicle over a rail system in accordance with some embodiments of the present disclosure. In some embodiments, a monitor vehicle includes a wheeled trolley 10, an inspection device 50, an overhead vehicle body 80, and at least one supporting structure S. The wheeled trolley 10 is operable to move over one or more rails 610 of the rail system 60 along a predetermined route. The supporting structure S connects the wheeled trolley 10 and the overhead vehicle body 80. The inspection device 50 includes at least one sensor disposed on the wheeled trolley 10 to detect at least one parameter of the rails 610 of the rail system 60. Accordingly, the monitor vehicle may steadily be moved over the rails 610. During the movement of the monitor vehicle, the sensor of the inspection device 50 on the wheeled trolley 10 may be moved along with the monitor vehicle in a freely displaceable manner, and hence the inspection device 50 may detect the parameters of the rails 610 of the rail system 60 along the predetermined route.

Figure 3:
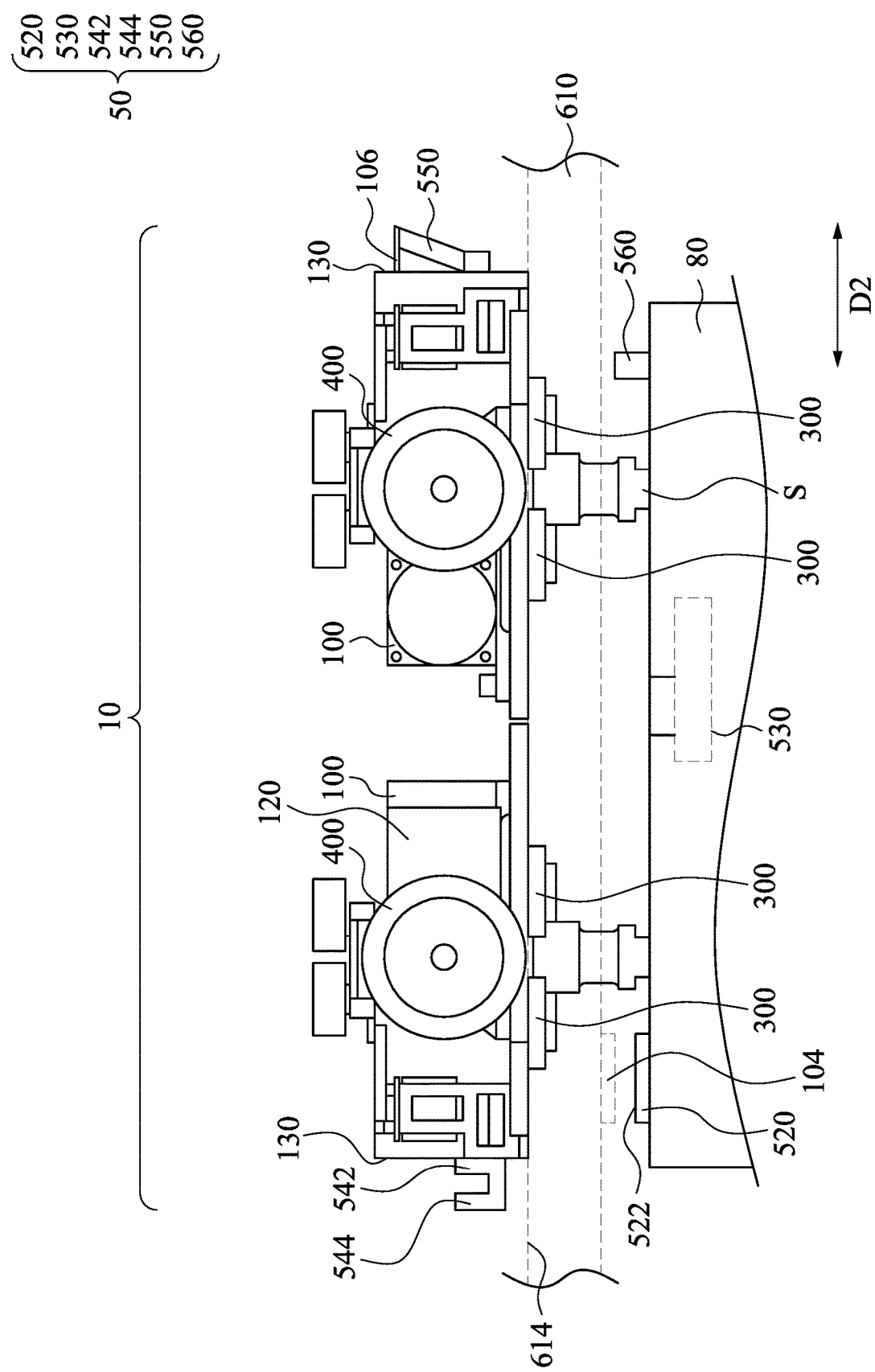
FIG. 3 is another cross-sectional view of monitor vehicle in a rail system in accordance with some embodiments of the present disclosure.

In some embodiments, the wheeled trolley 10 is movably coupled to the rails 610 of the rail system 60 installed on a ceiling side. More particularly, the rail system 60 includes a pair of rails 610 spaced apart from each other in an arrangement direction D1 of the rails 610 perpendicular to a lengthwise direction D2 of the rails 610, and a cross-sectional view of the rail 610 is substantially of a C-shaped configuration, as illustrated in FIG. 2. The wheeled trolley 10 may be supported from the pair of rails 610 of the rail system 60, so as to enable the monitor vehicle to travel in the rail system 60 along the lengthwise direction D2 of the rails 610. In some embodiments, the wheeled trolley 10 includes at least one main body 100, an actuator 200, at least one pair of auxiliary guiding wheels 300, and at least one pair of guiding wheels 400. The main body 100 includes a bottom surface 110, a pair of first sidewalls 120, and a pair of second sidewalls 130. The bottom surface 110, the pair of first sidewalls 120, and the pair of second sidewalls 130 define an accommodating space SP. The accommodation space SP may accommodate an electronic device, such as a driver, a circuit board, a controller or other suitable devices to operate the monitor vehicle. The actuator 200 is disposed in the accommodation space SP of the main body 100, and the actuator 200 is configured to actuate the wheeled trolley 10 to move along the rails 610. For example, the actuator 200 may be, not limited to be, an engine, a motor, a solenoid or other suitable devices. In some embodiments, for example, as shown in FIG. 3, the wheeled trolley 10 includes two main bodies 100, two pairs of guiding wheels 400 and four pairs of auxiliary guiding wheels 300. One of the main bodies 100 is located behind the other in the lengthwise direction D2 of the rails 610, and each of the main bodies 100 has one pair of guiding wheels 400 and two pairs of auxiliary guiding wheels 300.

In some embodiments, the guiding wheels 400 are respectively disposed on two opposite sides of the main body 100, such as on the opposite first sidewalls 120. The guiding wheels 400 are rotatably journaled on support shafts 402, and in contact with the top surfaces 614 of the rails 610. The guiding wheels 400 may be, but not limited to be, rollers, wheels or other suitable devices. Stated differently, the guiding wheels 400 are connected to the main body 100 by shafts 402 having a first axial direction D4 substantially parallel to the top surface 614 of the rail 610. Therefore, when the monitor vehicle is placed over the pair of rails 610, the guiding wheels 400 can respectively roll along the top surfaces 614 of the left and right rails 610 of the rail system 60.

In some embodiments, the auxiliary guiding wheels 300 are respectively disposed on left and right portions of the bottom surface 110 of the main body 100. The auxiliary guiding wheels 300 travel within confines of the C-shaped rails 610 and in contact with the inner surfaces 612 of the rails 610, and engage the inner surface 612 in a guiding manner in cooperation with guiding wheels 400, so that horizontal vibration during travel of the main body 100 may be prevented, and travel of the vehicle may also be performed more stably and quickly. The auxiliary guiding wheels 300 may be, but not limited to be, rollers, wheels or other suitable components. More particularly, the auxiliary guiding wheels 300 are connected to the main body 100 by shafts 302 having a second axial direction D3 substantially parallel to the inner surfaces 612 of the rails 610. Therefore, when the monitor vehicle is placed over the pair of rails 610, the auxiliary guiding wheels 300 can respectively roll along the inner surfaces 612 of the left and right rails 610 of the rail system 60.

In some embodiments, as shown in FIGS. 2 and 3, the supporting structures S extend below a bottom portion of the wheeled trolley 10. More particularly, the supporting structures S downwardly extend from the bottom surfaces 110 of the main bodies 100 to a top surface 810 of the overhead vehicle body 80. In other words, the supporting structure S has a top end S1 and a bottom end S2, the top end S1 is connected to the bottom surface 110 of the main body 100, and the bottom end S2 is connected to the top surface 810 of the overhead vehicle body 80. The overhead vehicle body 80 extends laterally from bottom ends S2 of the supporting structures S. State differently, the overhead vehicle body 80 is attached to the main body 100 by the supporting structures S.

In some embodiments, the overhead vehicle body 80 may be designed to accommodate, but not limited to, articles, such as front open unified pods (FOUPs), wafer carriers, cassette, reticle carriers, or other suitable articles. When the monitor vehicle is placed over the rail system 60, the supporting structures S may be located in a gap G between the pair of rails 610, and the overhead vehicle body 80 may be located below the rails 610.

In some embodiments, as shown in FIG. 2, the monitor vehicle may further include a controller 700 communicatively coupled (or electrically coupled) to the inspection device 50. The controller 700 is configured to drive the inspection device 50. The inspection device 50 includes at least one thermal sensor 510. The thermal sensor 510 is disposed on the bottom surface 110 of the main body 100, and the overhead vehicle body 80 is in a position lower than the thermal sensor 510. The thermal sensor 510 is configured to detect a temperature around the rails 610. More particularly, the thermal sensor 510 is configured to detect a temperature of electricity supply lines 650, which will be discussed below.

In some embodiments, each of the rails 610 may include a top portion 616 and a bottom portion 618 monolithically connected to each other. The bottom portion 618 is below the top portion 616. The bottom portion 618 further includes a protruding portion 620 extending form the bottom portion 618 in the arrangement direction D1 of the rails 610, and electricity supply lines 650 are embedded in the protruding portions 620 and extend in the lengthwise direction D2 of the rails 610 for providing an electric power. The electricity supply lines 650 are configured to provide the monitor vehicle with a magnetic field by causing alternating current to run through the electricity supply lines 650. More particularly, the overhead vehicle body 80 is supplied with driving electric power by the electricity supply lines 650, so the overhead vehicle body 80 can be moved along with the wheeled trolley 10 along the predetermined route. The thermal sensor 510 is configured to detect a temperature of the electricity supply line 650 in a non-contact manner. The thermal sensor 510 disposed on wheeled trolley 10 is configured to receive a heat transferred from the electricity supply lines 650 in the protruding portion 620. For example, in some embodiments, the thermal sensor 510 may be, a non-contact temperature-sensitive element, such as infrared sensors, semi-conductive temperature-sensitive elements such as thermocouples or thermopiles, wires of dissimilar metallic, or other suitable components. When the monitor vehicle is placed over the rail system 60, the thermal sensor 510 may be moved along with the main body 100 in a freely displaceable manner, so as to detect the temperature of the electricity supply lines 650 along the predetermined route.

Reference is made to FIG. 2 and FIG. 3. In some embodiments, the inspection device 50 includes an image sensor 550 with a field of view that covers an outside of the wheeled trolley 10. The image sensor 550 is configured to capture images of the rails 610, and hence the field of view of the image sensor 550 overlaps at least one portion of the rails 610, such as the top surfaces 614, the inner surfaces 612, the protruding portions 620 of the rails 610, or combinations thereof. More particularly, the image sensor 550 is disposed on the second sidewall 130 of the main body 100 higher than the auxiliary guiding wheels 300. For example, as shown in FIG. 3, the image sensor 550 may be mounted to the main body 100 by a connection member 106, and the field of view of the image sensor 550 may overlap at least one portion of the rails 610. By such images of the rails 610 captured by the image sensor 550, the monitor vehicle may monitor a state, such as cleanliness, about the rail 610 along the predetermined route. In some embodiments, the image sensor 550 may be, for example, a camera, a charge-coupled device (CCD), an active-pixel sensor (APS), or another suitable device.

Reference is made to FIGS. 2 and 3. In some embodiments, the inspection device 50 includes first and second rangefinders 542 and 544 disposed on the second sidewall 130 of the main body 100. The second sidewall 130 where the rangefinders 542 and 544 disposed is different to the second sidewall 130 where the image sensor 550 disposed in some embodiments. More particularly, the rangefinders 542 and 544 are disposed behind the image sensor 550 in the lengthwise direction D2 of the rails 610 to avoid the rangefinders 542 and 544 from interfering in the field of view of the image sensor 550. For example, the image sensor 550 and the rangefinders 542, 544 are respectively disposed on front and rear sidewalls 130 of the same main body 100. Alternatively, the image sensor 550 and the rangefinders 542, 544 are respectively disposed on the front or rear second sidewalls 130 of the different main bodies 100. The rangefinders 542, 544 are spaced apart from each other in the lengthwise direction D2 of the rails 610. State differently, the rangefinders 542 and 544 are arranged in the movable direction (that is, the lengthwise direction D2 of the rails 610) of the wheeled trolley 10, and the rangefinders 542 and 544 are configured to detect distances from the rangefinders 542 and 544 to the rail 610. For example, the rangefinders 542 and 544 may emit lights, such as laser beams, to determine the distances from the rangefinders 542 and 544 to rail 610.

In some embodiments, for example, the first and second rangefinders 542 and 544 are spaced apart by a distance. The first rangefinder 542 may include a first light emitting unit and a first light receiving unit (not shown in the figure), the first light emitting unit may emit a first light beam toward the top surface 614 of a first portion of the rail 610, and the first light beam arriving at the top surface 614 may be reflected by the first portion of the top surface 614, so as to propagate toward the first rangefinder 542. Then, the reflected first light beam may be received by the first light receiving unit after a first time interval. By analyzing the first time interval, the first rangefinder 542 may obtain a first distance from the first rangefinder 542 to a first portion of the top surface 614, so as to obtain a first height of the first portion of the top surface 614. Similarly, the second rangefinder 544 may include a second light emitting unit and a second light receiving unit (not shown in the figure), the second light emitting unit may emit a second light beam toward the top surface 614 of a second portion of the rail 610, and the second light beam arriving at the top surface 614 may be reflected by the second portion of the top surface 614, so as to propagate toward the second rangefinder 544. Then, the reflected light beam may be received by the second light receiving unit after a second time interval. By analyzing the second time interval, the second rangefinder 544 may obtain a second distance from the second rangefinder 544 to a second portion of the top surface 614, so as to obtain a second height of the second portion of the top surface 614. By such a configuration of the first rangefinder 542 and the second rangefinder 544, a height difference between different portions of the top surface 614 of the rail 610 can be obtained, so as to detect the height difference of the rail 610 along the predetermined route. In other embodiments, the rangefinders 542 and 544 may be, but not limited to be, laser rangefinders, or other suitable distance measuring equipment (DME).

In some embodiments, as shown in FIG. 2, the electricity supply lines 650 are respectively embedded in the rails 610. The monitor vehicle includes a proximity sensor 560 disposed on the top surface 810 of the overhead vehicle body 80, and the proximity sensor 560 faces toward the bottom side of the rails 610. The proximity sensor 560 is configured to detect a distance between the electricity supply lines 650 embedded in the rails 610. For example, two electricity supply lines 650 are spaced apart from each other in the arrangement direction D1 of the rails 610, and the proximity sensor 560 may detect the distance between the pair of electricity supply lines 650 in an electromagnetic induction manner. In other words, the proximity sensor 560 may detect the presence of electricity supply lines 650 without any physical contact. For example, the proximity sensor 560 may generate an electromagnetic field or emit a beam of electromagnetic radiation (infrared, for instance) toward the electricity supply lines 650, and then detect a variation of the electromagnetic field or the beam of electromagnetic radiation. Therefore, the proximity sensor 560 may obtain position of the pair of electricity supply lines 650, so as to obtain the parameter of rail deformation. In some embodiments, for example, the proximity sensor 560 may be, but not limited to be, an inductive proximity sensor or other suitable device. In some embodiments, for example, the proximity sensor 560 may include, but not limited to, a capacitive, a photoelectric sensor, or other suitable components.

In some embodiments, as shown in FIG. 2 and FIG. 3, the monitor vehicle further includes a light intensity sensor 520 disposed on the top surface 810 of the overhead vehicle body 80, and the light intensity sensor 520 has a light receive unit 522 facing toward the bottom side of the rails. The light intensity sensor 520 is communicatively coupled to the controller 700. The light intensity sensor 520 is configured to detect light intensity of an optical signal from a positioning tag 104 along the predetermined route. More particularly, the positioning tag 104 is disposed at a predetermined position of the bottom portion 618 of the rails 610, and the positioning tag 104 is configured to transmit the optical signal with position information of the rails 610 of the rail system 60. The light receive unit 522 faces toward the positioning tag 104 to receive the optical signal from the positioning tag 104, and detect the light intensity of the optical signal. In some embodiments, the light intensity sensor 520 may be, but not limited to be, light-sensitive devices such as a phototransistor, a photodiode, an optical fiber pressure sensor or other suitable components. By detecting the light intensity of the optical signal from the positioning tag 104, the monitor vehicle may detect whether a light source of the positioning tag 104 is in degradation.

In some embodiments, as shown in FIG. 2 and FIG. 3, the monitor vehicle further includes a vibration sensor 530 disposed in the overhead vehicle body 80. The vibration sensor 530 is communicatively coupled to the controller 700. The vibration sensor 530 is configured to convert vibrations of the overhead vehicle body 80 to electrical signals along the predetermined route. In other words, the vibration sensor 530 is disposed in the overhead vehicle body 80 to imitate a situation of the articles (e.g. wafers) being in the overhead vehicle body 80 and detect the vibrations from the overhead vehicle body 80 when the monitor vehicle is moved over the rails 610. In some embodiments, the vibration sensor 530 may be, for example, a micromechanical shock device, a piezoelectric device, or other suitable devices. In other embodiments, the vibration sensor 530 may include an accelerometer, a displacement sensor, a velocity sensor, or the like, so as to detect any vibrations in the overhead vehicle body 80.

Figure 4:
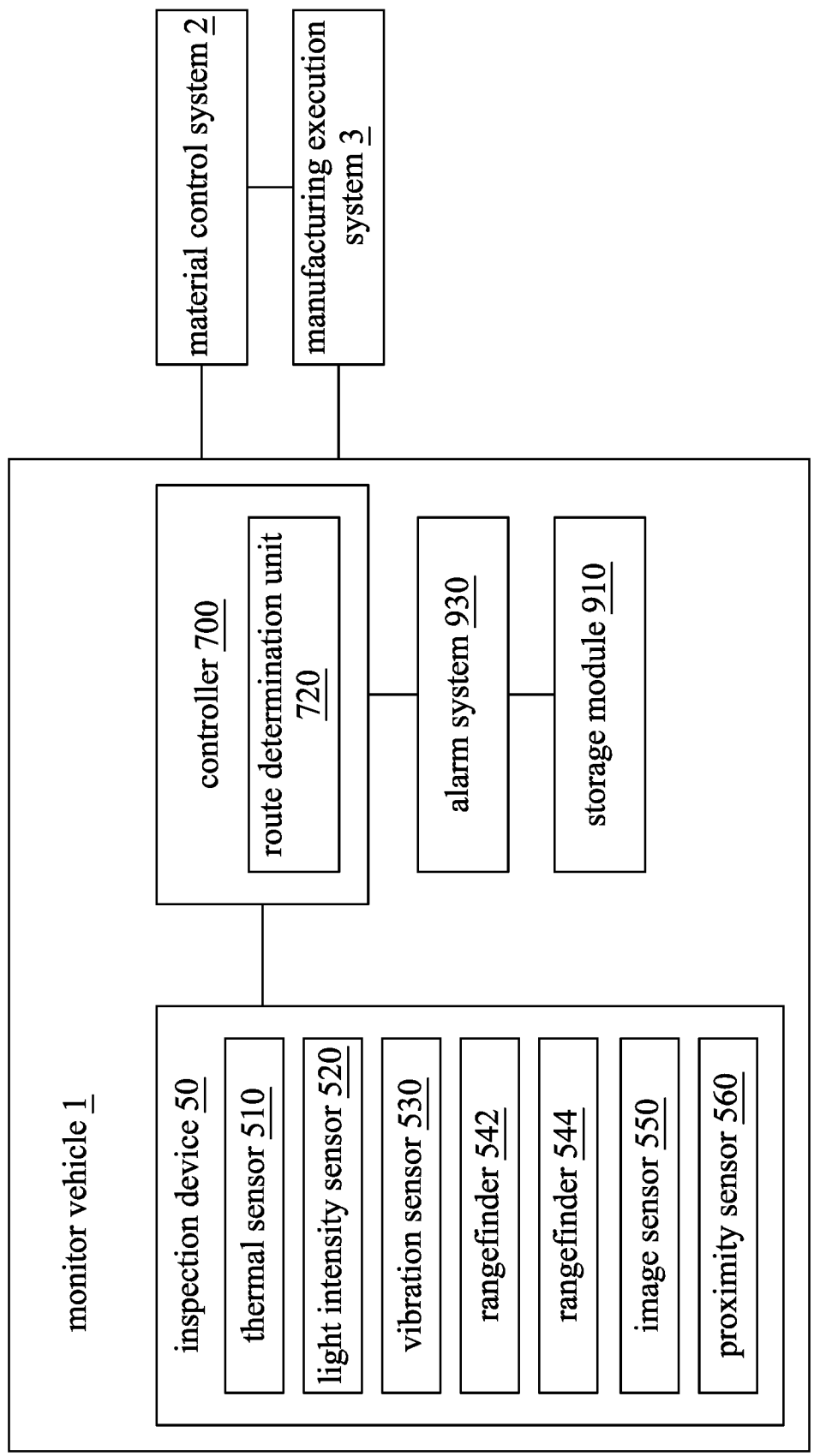
FIG. 4 is a block diagram of a monitor vehicle for a rail system in accordance with some embodiments of the present disclosure.

Reference is made to FIG. 4. FIG. 4 is a block diagram of a monitor vehicle 1 for a rail system in accordance with some embodiments of the present disclosure. In some embodiments, the monitor vehicle 1 includes a storage module 910 and an alarm system 930. The storage module 910 is communicatively coupled to the controller 700 and configured to record the detected parameters of the one or more rails 610 of the rail system 60, such as a rail temperature, a rail image, a rail height difference, a light intensity of optical signal from the rail system 60, a vibration of the overhead vehicle body 80, a rail deformation, the combination thereof, or the like. The alarm system 930 is communicatively coupled to the storage module 910 and the controller 700. The alarm system 930 is configured to determine whether the rail system is abnormal depending on the detected parameters of rails 610. More particularly, the alarm system 930 may include a rail parameter database, and the rail parameter database may store standard rail parameters. When the detected rail parameters recorded in the storage module 910 are out of the range of the standard parameters of the rails 610, the alarm system 930 may determine the rail system as abnormal. In some embodiments, for examples, the storage module 910 and the alarm system 930 may be executed by a computer program of an electronic device and be stored in a storage device. The storage device may include a non-transient computer readable recording medium or other devices having a storage function. The computer program may include, but is not limited to, a plurality of program instructions which can be executed by a central processing unit, so as to execute the respective functions of the module and system.

In some embodiments, for examples, the rail system may be, but not limited to be, an automated material handling system (AMHS), such as an overhead hoist transport system (OHTS). In some embodiments, the monitor vehicle 1 may be intergraded into a material control system (MCS) 2 to prevent from colliding with other vehicles over the rails 610. In other words, the controller 700 of the monitor vehicle 1 is communicatively coupled to the material control system 2. The material control system 2 may be connected to a plurality of host computers, and each of the host computer is connected one or more equipment. The host computer may have an equipment automation program (EPA) to transmit signals and assign operations to the equipment, other vehicles, and the monitor vehicles 1.

In some embodiments, the controller 700 may include a route determination unit 720. More particularly, the route determination unit 720 may be intergraded into the controller 700 of the monitor vehicle 1 to provide instructions to drive the actuator 200, so the wheeled trolley 10 may be moved along the predetermined route by the actuator 200. In some embodiments, for examples, the route determination unit 720 may be written with one or more predetermined routes, and each of the predetermined routes may correspond to different duration times. For example, a first route corresponds to a first duration time, and a second route corresponds to a second duration time different from the first duration time. In some embodiments, the controller 700 of the monitor vehicle 1 is communicatively coupled to the manufacturing execution system 3, and the route determination unit 720 may instruct the monitor vehicle 1 depending on the manufacturing execution system 3. The manufacturing execution system 3 may have, but not limited to, a unit of planning a transport route of an article, a unit of optimizing a transport route of an article, or a unit of recoding a transport route of an article.

Figure 5:
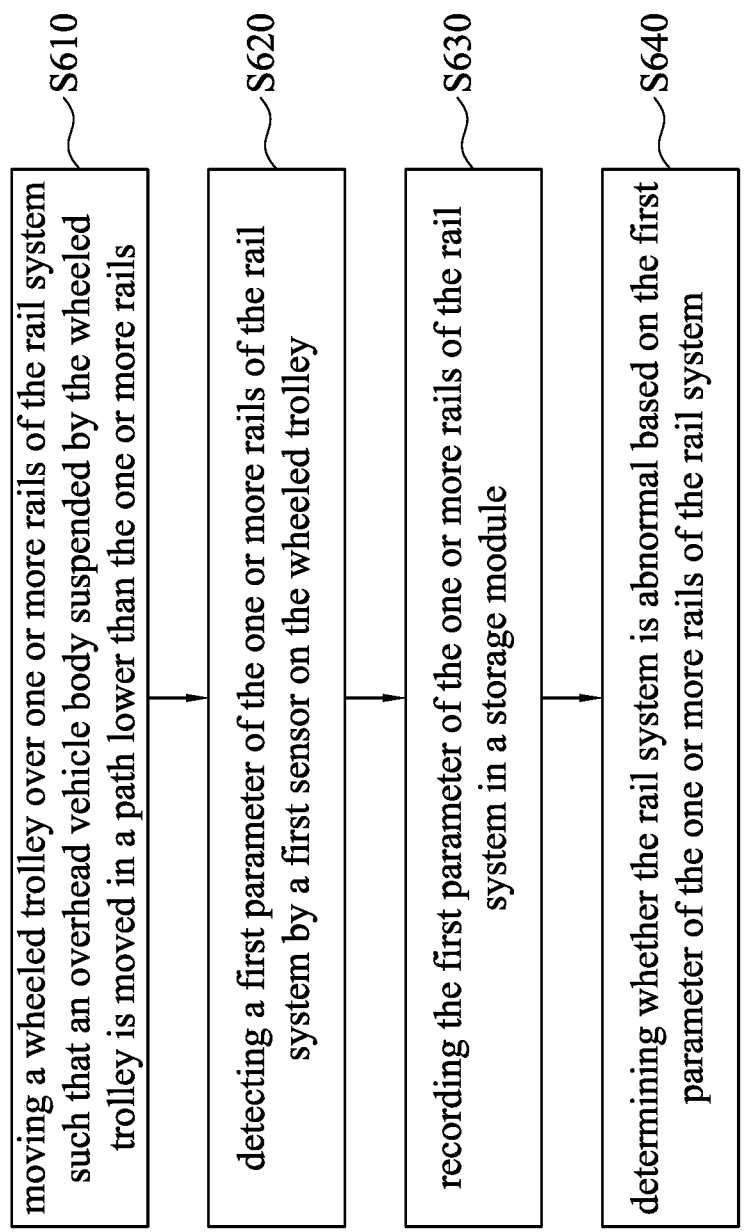
FIG. 5 is a flow chart of a method for monitoring a rail system in accordance with some embodiments of the present disclosure.

Reference is made to FIG. 5. FIG. 5 is a flow chart of a method for monitoring the rail system 60. In some embodiments, the method for monitoring the rail system includes the following steps. In step S610, the wheeled trolley 10 is operated over the one or more rails 610 of the rail system. In step S620, a plurality of first parameters of the one or more rails 610 are detected by a plurality of first sensors disposed on the wheeled trolley 10. For example, the first sensors may include the thermal sensor 510, the first and second rangefinders 540, the image sensor 550, or combinations thereof, as discussed previously. A plurality of second parameters of the one or more rails 610 are detected by a plurality of second sensors disposed on the overhead vehicle body 80. For example, the second sensors may include the light intensity sensor 520, the vibration sensor 530, the proximity sensor 560, or combinations thereof, as discussed previously.

In step 630, the detected first and second parameters of the one or more rails 610 are recorded in the storage module 910. In step 640, the rail system 60 can be determined as normal or abnormal based on the detected first and/or second parameters. By detecting or monitoring the first and/or second parameters of the one or more rails 610, the rail system 60 can prevent the transportation abnormalities during transporting the articles (e.g. semiconductor wafers), thereby reducing a risk of unexpected damage, particles or features being formed on the wafers, and may also increase the yield rate of the manufacturing process.

In some embodiments, the inspecting of the rail system further includes the following steps. The monitor device is movably coupled to the rails 610 along the predetermined route, the temperature of the electricity supply line 650 embedded in the rails 610 is detected by the thermal sensor 510, the light intensity of the optical signal from the positioning tag 104 is detected by the light intensity sensor 520, the vibrations of the overhead vehicle body 80 is measured by the vibration sensor 530, the height difference between different segments of the rail 610 is measured by the pair of the rangefinders 540, the images of the rail 610 are captured by the image sensor 550, and the distance between the pair of supply lines 650 is detected by the proximity sensor 560.

In one or more embodiments of the present disclosure, since the inspection device includes at least one sensor disposed on the wheeled trolley to detect at least one parameter of the rails of the rail system, and the wheeled trolley is operable to move over the one or more rails of the rail system. Accordingly, during the movement of the monitor vehicle, the sensor of the inspection device on the wheeled trolley may be moved along with the monitor vehicle, so as to detect parameters related to the rail system along the moving path. By detecting the parameters related to the rail system, the rail system can reduce a risk of unexpected damages, particles or features formed on the articles and increasing the yield rate of the manufacturing process.

According to some embodiments, a monitor vehicle for a rail system includes a wheeled trolley, an overhead vehicle body, at least one supporting structure, and at least one first sensor. The wheeled trolley is operable to move over one or more rails of the rail system. The supporting structure connects the wheeled trolley and overhead vehicle body. The first sensor is on the wheeled trolley and configured to detect at least one first parameter of the one or more rails of the rail system.

According to some embodiments, a monitor vehicle for a rail system includes a wheeled trolley, an overhead vehicle body, at least one supporting structure, and at least one sensor. The wheeled trolley is operable to move over one or more rails of the rails system. The supporting structure connects the wheeled trolley and overhead vehicle body. The first sensor is on the overhead vehicle body and configured to detect a first parameter of the one or more rails of the rail system.

According to some embodiments, a method for monitoring a rail system includes moving a wheeled trolley over one or more rails of the rail system such that an overhead vehicle body suspended by the wheeled trolley is moved in a path lower than the one or more rails, detecting a first parameter of the one or more rails of the rail system by a first sensor on the wheeled trolley, recording the first parameter of the one or more rails of the rail system in a storage module, and determining whether the rail system is abnormal depending on the first parameter of the one or more rails of the rail system.

In some embodiments, a monitor vehicle for a rail system includes a wheeled trolley, an overhead vehicle, a supporting structure, and a first sensor. The wheeled trolley is above a rail of the rail system, is operable to move over the rail, and has a bottom surface. The overhead vehicle body is suspended by the wheeled trolley and below the rail. The supporting structure connects the wheeled trolley and the overhead vehicle body. The first sensor is on the bottom surface of the wheeled trolley and is configured to detect a first parameter of the rail of the rail system.

In some embodiments, a monitor vehicle for a rail system includes a first wheeled trolley, a second wheeled trolley, an overhead vehicle body, and a first sensor. The first wheeled trolley is above a rail of the rail system and is operable to move over the rail. The second wheeled trolley is above the rail of the rail system, is operable to move over the rail, is spaced apart from the first wheeled trolley, and has a rear surface opposite to the first wheeled trolley. The overhead vehicle body is suspended by the first and second wheeled trolleys and below the rail. The first sensor is on the rear surface of the second wheeled trolley and is configured to detect a first parameter of the rail of the rail system.

In some embodiments, a method for monitoring a rail system includes moving a wheeled trolley in a first path higher than a rail of a rail system such that an overhead vehicle body suspended by the wheeled trolley is moved in a second path lower than the rail; detecting a parameter of the rail of the rail system by a sensor on the overhead vehicle body; and determining whether the rail system is abnormal depending on the parameter of the rail of the rail system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A monitor vehicle for a rail system, comprising:
   a wheeled trolley above a rail of the rail system, operable to move over the rail, and having a bottom surface;
   an overhead vehicle body suspended by the wheeled trolley and below the rail;
   a supporting structure connecting the wheeled trolley and the overhead vehicle body; and
   a first sensor on the bottom surface of the wheeled trolley and configured to detect a first parameter of the rail of the rail system.

2. The monitor vehicle of claim 1, wherein the first sensor is a thermal sensor configured to detect a temperature of an electricity supply line that is on the rail and that drives the monitor vehicle to move along the rail in a non-contact manner.

3. The monitor vehicle of claim 1, wherein the first sensor vertically overlaps an electricity supply line that is on the rail.

4. The monitor vehicle of claim 1, wherein the first sensor is in a position higher than a top surface of the overhead vehicle body.

5. The monitor vehicle of claim 1, wherein the wheeled trolley comprises a main body and at least one wheel disposed on the bottom surface of the main body, and the wheels is configured to roll along an inner surface of the rail.

6. The monitor vehicle of claim 1, wherein the wheeled trolley comprises a main body and a pair of wheels disposed on opposite sidewalls of the main body, and the wheels is configured to roll along a top surface of the rail.

7. The monitor vehicle of claim 6, wherein a bottom end of the first sensor is higher than bottom ends of the wheels.

8. The monitor vehicle of claim 1, further comprising a second sensor on the bottom surface of the wheeled trolley and configured to detect a second parameter of the rail of the rail system, wherein the first and second sensor are configured to arrange along a direction substantially perpendicular to a lengthwise direction of the rail.

9. The monitor vehicle of claim 8, wherein the second sensor is a thermal sensor.

10. The monitor vehicle of claim 1, further comprising a second sensor on a top surface of the overhead vehicle body.

11. A monitor vehicle for a rail system, comprising:
    a first wheeled trolley above a rail of the rail system and operable to move over the rail;
    a second wheeled trolley above the rail of the rail system, operable to move over the rail, spaced apart from the first wheeled trolley, and having a rear surface opposite to the first wheeled trolley;
    an overhead vehicle body suspended by the first and second wheeled trolleys and below the rail; and
    a first sensor on the rear surface of the second wheeled trolley and configured to detect a first parameter of the rail of the rail system.

12. The monitor vehicle of claim 11, wherein the first and second wheeled trolleys are configured to arrange along a lengthwise direction of the rail.

13. The monitor vehicle of claim 11, wherein the first sensor is an image sensor configured to capture an image of the rail.

14. The monitor vehicle of claim 11, wherein the first sensor does not vertically overlap the wheeled trolley.

15. The monitor vehicle of claim 11, wherein when viewed in a cross section taken along a lengthwise direction of the rail, the first sensor has longitudinal axis inclined with the rear surface of the wheeled trolley.

16. The monitor vehicle of claim 11, further comprising a second sensor on a front surface of the wheeled trolley opposite to the second wheeled trolley, and the second sensor configured to detect a second parameter of the rail of the rail system.

17. A method for monitoring a rail system comprising:
moving a wheeled trolley in a first path higher than a rail of a rail system such that an overhead vehicle body suspended by the wheeled trolley is moved in a second path lower than the rail;
detecting a parameter of the rail of the rail system by a sensor on the overhead vehicle body; and
determining whether the rail system is abnormal depending on the parameter of the rail of the rail system.

18. The method of claim 17, further comprising:
recording the parameter of the rail of the rail system in a storage module.

19. The method of claim 17, wherein the parameter is a light intensity of optical signal from the rail of the rail system.

20. The method of claim 17, wherein the parameter is a vibration of the overhead vehicle body.

\* \* \* \* \*